(12) United States Patent
Turaga et al.

(10) Patent No.: US 7,092,448 B2
(45) Date of Patent: Aug. 15, 2006

(54) METHOD AND SYSTEM FOR ESTIMATING NO-REFERENCE OBJECTIVE QUALITY OF VIDEO DATA

(75) Inventors: Deepak S. Turaga, Croton on Hudson, NY (US); Yingwei Chen, Briarcliff Manor, NY (US); Jorge Caviedes, Yorktown Hts, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 803 days.

(21) Appl. No.: 10/155,211

(22) Filed: May 24, 2002

(65) Prior Publication Data

US 2003/0219070 A1    Nov. 27, 2003

(51) Int. Cl.
*H04N 7/12*    (2006.01)

(52) U.S. Cl. .............................. 375/240.26; 375/240.27

(58) Field of Classification Search ........... 375/240.12, 375/240.13, 240.18, 240.19, 240.24, 240.25, 375/240.26, 240.27, 243, 240.29, 240.03; 348/420.1, 425.1, 425.2, 408.1, 671; 382/235, 382/237, 268, 276, 251; 725/107, 130, 150
See application file for complete search history.

(56) References Cited

U.S. PATENT DOCUMENTS 5,790,717 A * 8/1998 Judd ........................... 382/323
6,067,118 A    5/2000 Chen et al. .................. 348/405
6,101,278 A    8/2000 Chen et al. .................. 382/239
6,810,083 B1 * 10/2004 Chen et al. ............ 375/240.25
2003/0031368 A1 * 2/2003 Myler et al. ................. 382/228
2004/0114685 A1 * 6/2004 Kouloheris et al. ..... 375/240.03

OTHER PUBLICATIONS

Furusho et al, "Picture Quality Evaluation Model For Color Coded Images: Considering Observing Points and Local Feature of Image", International Conference On Image Processing, vol. 4, pp. 343-347, Oct. 1999.*
Miyahara et al, "Objective Picture Quality Scale (PQS) for Image Coding", IEEE Transactions on Communications, vol. 46, No. 9, pp. 1215-1226, Sep. 1998.*

* cited by examiner

*Primary Examiner*—Vu Le

(57) ABSTRACT

The present invention relates to a method and system for estimating the quality of encoded video data without gaining access to the source data. The system is configured to decode compressed video data using an MPEG/H.263 decoder to produce decompressed video data. The decoded data is subject to a discrete cosine transform (DCT) to produce a set of DCT coefficients of the decompressed video data is determined to be intra-coded. Meanwhile, the quantization matrix including a quantizier step size for each block of the decompressed video data are extracted. Following this, statistical properties of the DCT coefficients are extracted from the decoded video. Then, an average quantization error for both AC and DC coefficients is determined using information regarding the quantization and the statistical properties. Finally, this estimated quantization error is used for in computing a peak signal to noise ratio (PSNR).

24 Claims, 3 Drawing Sheets

METHOD AND SYSTEM FOR ESTIMATING NO-REFERENCE OBJECTIVE QUALITY OF VIDEO DATA

BACKGROUND OF THE INVENTION

1. Field of the Invention

The present invention relates to a method and system for evaluating the quality of compressed video and image data and, in particular, to a method and system for estimating the objective quality of pictures, namely the Peak Signal-to-Noise Ratio (PSNR), without referring to the source video or image data.

2. Description of the Related Art

It is the ultimate goal of the video experts to provide most perceptually appealing video images to viewers. One way to determine whether the resulting image quality is good or poor is to ask a panel of viewers to watch certain video sequences to provide their opinions. Another way to analyze video sequences is to provide an automated mechanism to evaluate the excellence or the degradation of the video quality. This type of procedure is known as "objective video quality assessment."

A common approach to measuring the picture quality of a compression process is to make a comparison between the processed image and the unprocessed source images (hereinafter referred to as "double-ended measurement"). Various metrics are used, i.e., Block Artifact Metric (BAM), PSNR, Perceptually Weighted PSNR, etc., to evaluate an objective picture-quality measure. In particular, the PSNR is the most commonly used parameter for measuring any picture quality, especially in evaluating an MPEG-2 video bitstream. However, the double-ended measurement has some drawbacks in that access to both the processed picture and the source picture is not feasible if the source data or the alignment between the source and processed pictures is unavailable. In order to overcome this problem, a "single-ended measurement" has been proposed to monitor the video quality when the source is neither available nor controllable. Unlike the double-ended measurement, the single-ended measurement technique operates on the compressed picture without access to the source picture when evaluating video quality.

Many user-end applications require an estimate of coded video or image (herein referred to as pictures) quality. For instance, the user-end might need to enhance or post-process the pictures. In such a scenario, a measure of quality is essential in the control loop. Accordingly, the present invention proposes an improved objective quality assessment using the PSNR metric to evaluate the objective quality of compressed pictures without utilizing the source data.

SUMMARY OF THE INVENTION

The present invention is directed to an apparatus and method for evaluating the quality of encoded video data without access to the source data, by utilizing statistical properties estimated directly from the decompressed picture.

In the preferred embodiment, accurate parameters of statistical models for the original data are estimated from the decoded data and are used in conjunction with knowledge of coding parameters, i.e., quantization, to estimate the quantization error and hence the quality.

According to one aspect of the invention, a method of evaluating the quality of encoded video data without accessing the source data is provided. At least a substantial portion of the encoded video data is decoded to produce decompressed video data, which includes a plurality of blocks. If an intra-coded data is detected, a discrete cosine transform (DCT) on the decompressed video data is performed to produce a set of DCT coefficients including at least one DC frequency band and at least one AC frequency band. The intra-coded picture is detected by extracting an intra-dc-precision level from the decompressed video data, and then determining whether the intra-dc-precision level is less than a predefined threshold. If so, it is determined that the decoded video data as the intra-coded picture. Thereafter, a DCT coefficient parameter ($\lambda^2$) and a quantization step size ($\Delta_{i,j}$) for each block of the decompressed video data obtained, then an average quantization error (D) for each set of the DCT coefficients is estimated based on the DCT coefficient parameter the quantizer step size, and finally a peak signal to noise ratio (PSNR) is determined based on the average quantization error(D). The quantization step size ($\Delta_{i,j}$) corresponds substantially to coding parameters used in a coding operation that was previously performed on the encoded video data. The estimation of the average quantization error (D) comprises the steps of estimating the average quantization error ($D_{i,j}$) for the AC frequency band and the step of estimating the average quantization error ($D_{0,0}$) for the DC frequency band, and the DCT coefficient parameter ($\lambda^2_{i,j}$) for the AC frequency band is determined by equating a computed second moment to an estimated second moment of the DCT coefficients.

According to another aspect of the invention, an apparatus for evaluating the quality of encoded video data is provided and includes a decoder for decoding at least a substantial portion of the encoded video data to produce therefrom decompressed video data, and for extracting quantization scale step for each block of the decoded video data; a discrete cosine transform (DCT) configured to transform the decompressed video data into a set of DCT coefficients comprised of DC and AC frequency bands; a quantization extractor for extracting a DCT coefficient parameter ($\lambda^2$) and a quantization step size ($\Delta_{i,j}$) for each block of the decompressed video data; a statistics estimator for estimating an average quantization error (D) for each set of the DCT coefficients based on the quantizer step size and the DCT coefficient parameter; and, a calculator for determining a peak signal to noise ratio (PSNR) based on the average quantization error (D). The statistics estimator operates to estimate the average quantization error (D) for the AC frequency band and the DC frequency band. The DCT coefficient parameter ($\lambda^2_{i,j}$) for the AC frequency band is determined by equating a computed second moment to an estimated second moment of the DCT coefficients. The apparatus further includes a picture detector for detecting for an intra-coded picture in each block of the decompressed video data.

The foregoing and other features and advantages of the invention will be apparent from the following, more detailed description of preferred embodiments as illustrated in the accompanying drawings in which reference characters refer to the same parts throughout the various views. The drawings are not necessarily to scale; instead the emphasis is placed upon illustrating the principles of the invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

In order to facilitate an understanding of this invention, background information relating to MPEG-2 and H.263 coding is explained. In general, the MPEG-2 and H.263 codings are performed on an image by dividing the image into macro-blocks of 16×16 pixels, each with a separate quantizer scale value associated therewith. The macro-blocks are further divided into individual blocks of 8×8 pixels. Each 8×8 pixel block is subjected to a discrete cosine transform (DCT) to generate DCT coefficients for each of the 64 frequency bands therein. The DCT coefficients in an 8×8 pixel block are then divided by a corresponding coding parameter, i.e., a quantization weight. The quantization weights for a given 8×8 pixel block are expressed in terms of an 8×8 quantization matrix. Thereafter, additional calculations are affected on the DCT coefficients to take into account, namely, the quantizer scale value, among other things, and thereby complete the MPEG-2 and H.263 codings.

Figure 1:
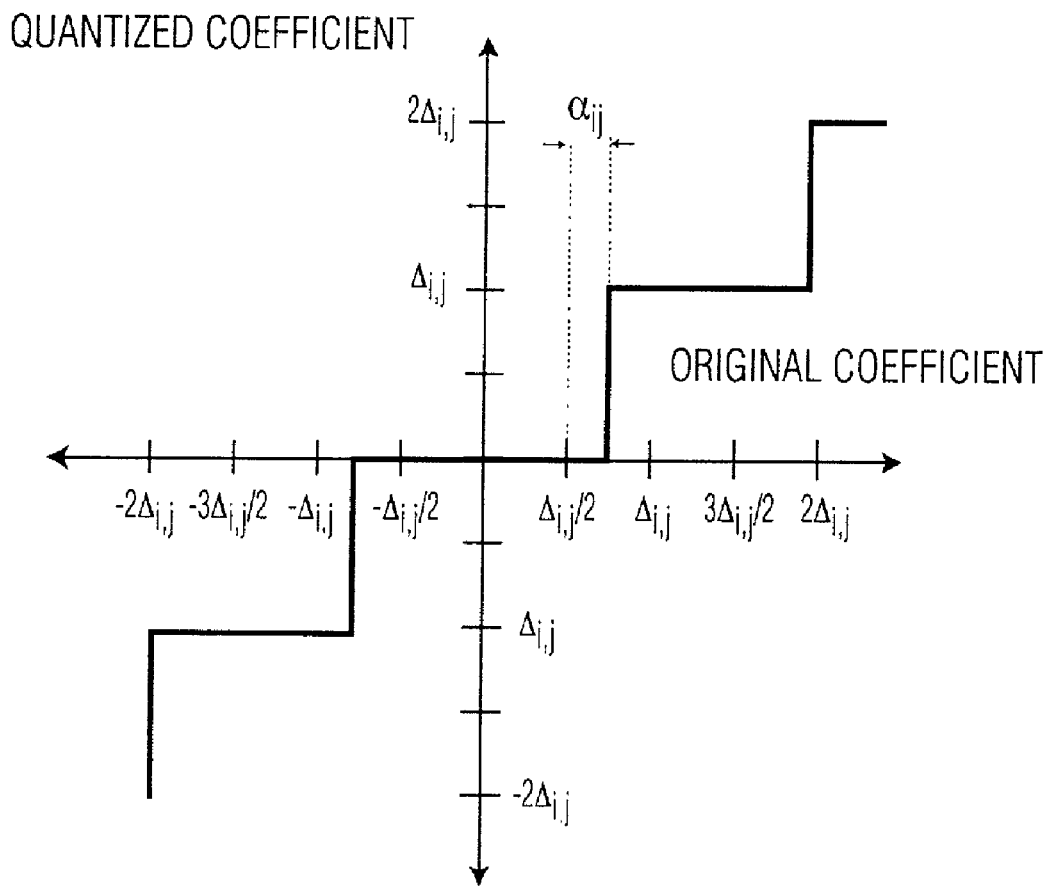
FIG. 1 is a graphical illustration of the quantization scheme recommended by the MPEG-2, MPEG-4, H.263, H.261, and JPEG standards.

Referring to FIG. 1, the quantization scheme recommended by the MPEG-2 and H.263 standards is shown graphically. Normally, the parameter $\Delta_{i,j}$ represents the step-size size between the quantized coefficients which may be related to the average frame quantization step Q and the MPEG quantization matrix $W_{i,j}$ as follows:

$$\Delta_{i,j} = \frac{W_{i,j}Q}{16}.$$

However, as shown in FIG. 1, the quantization scheme recommended by the MPEG-2 and H.263 standards involves shifting the reconstruction windows by $\alpha_{i,j}$. This parameter $\alpha_{i,j}$ is related to the step-size $\alpha_{i,j}$ as follows:

$$\alpha_{i,j} = \frac{3}{8}\Delta_{i,j}.$$

As one of average skilled in the art will appreciate, all loss occurs during the quantization stage. Thus, the average quantization-step size and the quantization-matrices measure some aspects of the quality of compressed pictures and hence are used sometimes directly as a quality metric. Accordingly, the present invention estimates the quantization error in the form of PSNR metric.

Figure 2:
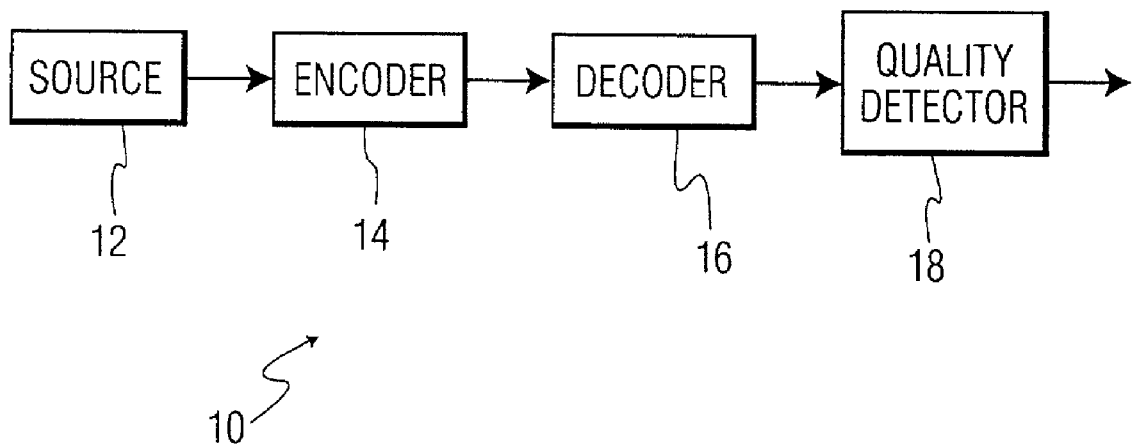
FIG. 2 is a simplified block diagram illustrating the picture-quality detector according to an embodiment of the present invention.

FIG. 2 is a simplified circuit diagram whereto the embodiment of the present invention is applied. The inventive system 10 includes a video source 12, an encoder 14, a decoder 16, and a quality detector 18. The source 12 may be any type of video-generating device, such as a television camera or other video equipment that is capable of generating video data, based on a particular image. The encoder 14 and decoder 16 may be any conventional encoder and decoder known in this art for encoding/decoding MPEG2 or H.263 video data, respectively. The detector 18 processes the decoded video data to evaluate the objective quality of compressed pictures based on a statistical analysis and without access to the source video data.

Figure 3:
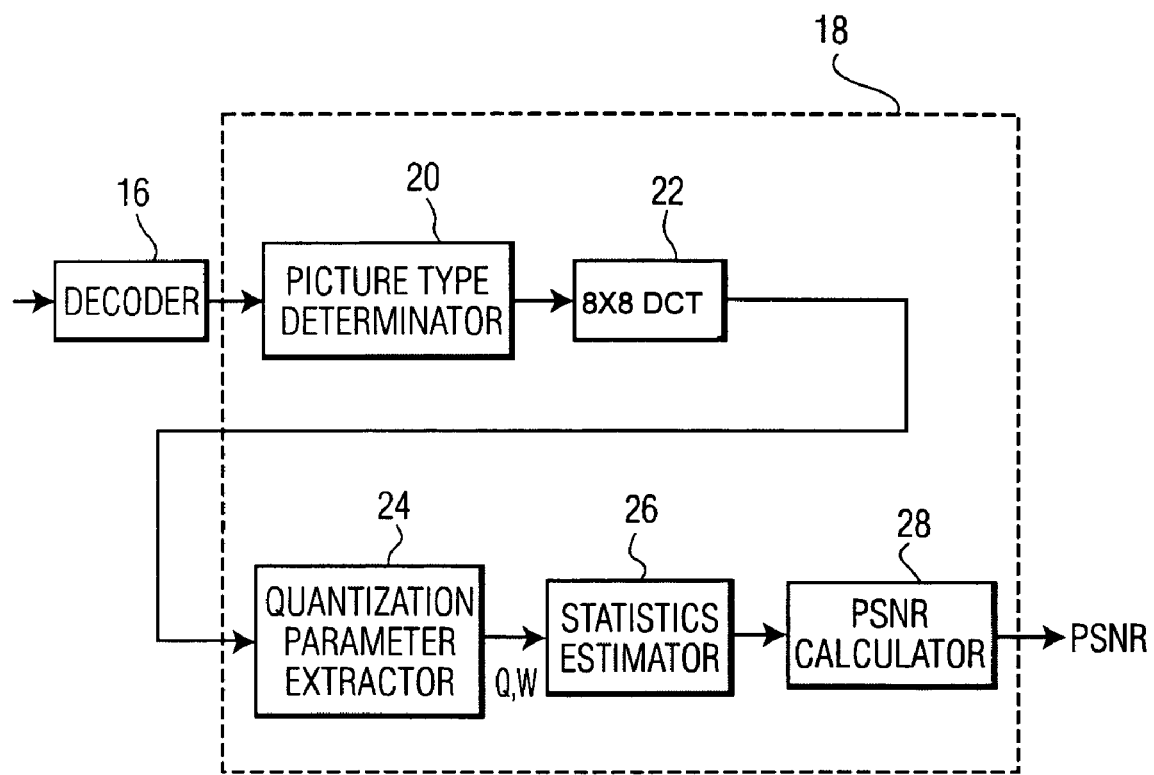
FIG. 3 is a simplified block diagram of the apparatus according to an exemplary embodiment of the present invention; and, FIG. 4 is a flow chart illustrating the operation steps of estimating picture quality in accordance with the present invention.

FIG. 3 depicts a representative hardware of the decoder 16 and the estimator 18 illustrated in FIG. 1 according to the embodiment of the present invention. In particular, the embodiment provides a mechanism for estimating video quality after the coded video data has been decompressed via the decoder 16. As shown in FIG. 3, the detector 18 includes a picture determinator 20, a 8×8 DCT 22, a quantization parameter extractor 24, a statistics estimator 26, and a PSNR calculator 28. It should be noted that the detector 18 shown in FIG. 3 may represent, i.e., a microprocessor, a central processing unit, a computer, a circuit card, an application-specific integrated circuit (ASICs), and a memory (not shown). A key principle of the invention relies on the fact that the quality of P and B pictures and hence the overall video is consistent in general with that of the intra-pictures for the MPEG-2 and H.263 coded video. Therefore, if the PSNR can be estimated only for intra-coded pictures, it serves as a quality metric for the overall video because the quantization matrices and the average quantization-step size tend to reflect some aspects of the picture quality.

In operation, the decoded video data, after being decoded by the decoder 16, is forwarded to the picture determinator 20 of the estimator 18. The picture determinator 20 then determines whether the decoded video data is intra-coded. U.S. Pat. No. 6,101,278 entitled, "System for Extracting Coding Parameters from Video Data," assigned to the same assignee, explains how to detect intra-coded video data, thereby incorporated herein as a reference. In MPEG-2 and H.263 video, intra_dc_precision controls the quantization coarseness of DC DCT coefficients in intra-coded macroblocks or intra-coded pictures and ranges from 8 to 11 bits, with 11 bits as the highest which results when no quantization error occurs in the intra-DC coefficients. In most broadcast-quality digital video, the intra_DC_precision is typically set to 8. Accordingly, if the estimated intra_DC_precision is less than 11, the current picture is determined to be intra-coded in the present invention. If the current picture being analyzed is an intra-coded picture, the DCT block 22 subjects the decoded video data to DCT processing in order to generate DCT coefficients for AC frequency bands. Thereafter, the quantization parameter extractor 24 operates to extract quantization matrices ($W_{i,j}$) and a quantizer-step size for each macroblock ($Q_m$) that corresponds to those used in a previous coding operation for the whole picture. As one of average skilled in the art will appreciate, a quantization matrix consists of sixty-four entries, each entry being designated with a weight. The sixty-four entries, each being an 8-bit integer ranging from 1 to 255, correspond to 8×8 DCT coefficients in a block. The weight and the quantizer scale-value determine the quantization-step sizes for a block of DCT coefficients. U.S. Pat. No. 6,101, 278 entitled, "System for Extracting Coding Parameters from Video Data," assigned to the same assignee, explains how to extract the quantization matrices ($W_{i,j}$) and the quantizer-step size for each macroblock $Q_m$, thereby incorporated herein as a reference.

Once the quantization matrices of the DCT coefficients are obtained, an analysis of the statistics of DCT coefficients is performed by the statistics estimator 26. Here, an assumption is made to the fact that the original picture DCT coefficients belong to Laplacian distributions with DCT coefficient parameter $\lambda_{i,j}$ for each AC location (i,j). An estimate of the second moment $S_{i,j}$ of the coded picture (i,j)th coefficients is performed, then the estimated second moment is related to the DCT coefficient parameter $\lambda_{i,j}$ to estimate the second moment more accurately. As one of skilled in the art can appreciate, the second moment $S_{i,j}$ of the coded data is computed as follows:

$$S_{i,j} = \frac{\sum_{b=1}^{N} (C_{i,j}^b)^2}{N}, \quad (1)$$

where $C_{i,j}^b$ is the (i,j)th AC coefficient in block b and N is the total number of blocks in the picture. Applicants have determined that $S_{i,j}$ is related to $\lambda_{i,j}$ according to the mathematical relationship as follows:

$$S_{i,j} = \Delta_{i,j}^2 e^{-\frac{\alpha_{i,j}}{\lambda_{i,j}}} e^{-\frac{3\Delta_{i,j}}{2\lambda_{i,j}}} \left[ \frac{1 + e^{-2\Delta_{i,j}/\lambda_{i,j}}}{\left(1 - e^{-\Delta_{i,j}/\lambda_{i,j}}\right)^2} \right]. \quad (2)$$

Thus, by comparing equations (1) and (2), the DCT coefficient parameter $\lambda_{i,j}$ can be determined even without access to the original DCT coefficients.

It is possible that sometimes, due to very coarse quantization used for higher frequency coefficients, using equation (2) can lead to an overestimation of the DCT coefficient parameter $\lambda_{i,j}$. In such cases, especially for the high frequency coefficients, we use an alternate relationship shown below.

$$S_{i,j} = 2\lambda_{i,j}^2 \quad (3)$$

The DCT coefficient parameter $\lambda_{i,j}$ is then estimated by comparing equations (1) and (3). This alternate relationship is used only for some high frequency AC coefficients, where coarse quantization leads to an inaccurate estimation of the parameter $\lambda_{i,j}$.

Typically, an estimate of $\lambda_{i,j}$ is made by comparing equations (1) and (2) for the low frequency AC coefficients, and an estimate of $\lambda_{i,j}$ is made by comparing equations (1) and (3) for some high frequency AC coefficients. Through a simulation, it is determined empirically that most accurate results are obtained by using the equations (1) and (2) for the first 24 AC coefficients and using equations (1) and (3) for the remaining AC coefficients.

After obtaining the quantization parameters and the parameters of the distribution of the original data, the statistics estimator 26 calculates the average quantization error incurred over the frame. Here, the average quantization error must be computed for both the DC and AC coefficients.

A. Calculation of the Quantization Error $D_{i,j}$ for AC Coefficients

For the (i,j)th AC coefficients, note that all values in the interval $\lfloor k\Delta_{i,j}+\alpha_{i,j}-\Delta_{i,j}/2, k\Delta_{i,j}+\alpha_{i,j}+\Delta_{i,j}/2 \rfloor$ are rounded to $k\Delta_{i,j}$ by the process of quantization, as shown in FIG. 1. This leads to the quantization error; thus, the mean-squared error for this data can be obtained by summing the error across all these intervals, i.e., find the error for each interval and sum it across all the intervals. This may be written mathematically as follows:

$$D_{i,j} = \frac{1}{2\lambda_{i,j}} \sum_{k=1}^{\infty} \int_{-k\Delta_{i,j}-\frac{\Delta_{i,j}}{2}-\alpha_{i,j}}^{-k\Delta_{i,j}+\frac{\Delta_{i,j}}{2}-\alpha_{i,j}} (x+k\Delta_{i,j})^2 e^{\frac{x}{\lambda_{i,j}}} dx + \quad (4)$$

$$\frac{1}{2\lambda_{i,j}} \sum_{k=1}^{\infty} \int_{k\Delta_{i,j}-\frac{\Delta_{i,j}}{2}+\alpha_{i,j}}^{k\Delta_{i,j}+\frac{\Delta_{i,j}}{2}+\alpha_{i,j}} (x-k\Delta_{i,j})^2 e^{\frac{-x}{\lambda_{i,j}}} dx +$$

$$\frac{1}{2\lambda_{i,j}} \int_{-\frac{\Delta_{i,j}}{2}-\alpha_{i,j}}^{\frac{\Delta_{i,j}}{2}+\alpha_{i,j}} x^2 e^{-\frac{|x|}{\lambda_{i,j}}} dx.$$

The equation (3) consists of three parts, the summation of the error across all intervals less than zero, the sum of the error across all intervals greater than zero, and the error over the interval centered around zero. The equation (3) can be simplified by solving the integrals as follows:

$$D_{i,j} = 2\lambda_{i,j}^2 - \frac{2\lambda_{i,j}\Delta_{i,j} e^{-\frac{\alpha_{i,j}}{\lambda_{i,j}}} e^{-\frac{\Delta_{i,j}}{2\lambda_{i,j}}}}{\left(1 - e^{-\Delta_{i,j}/\lambda_{i,j}}\right)} \left[\frac{\alpha_{i,j}}{\lambda_{i,j}} + 1\right]. \quad (5)$$

Thus, the simplified equation (4) may be used to estimate the AC coefficient error based on accurate estimates of $\lambda_{i,j}$ and the quantization-step size $\Delta_{i,j}$.

B. Calculation of the Quantization Error $D_{0,0}$ for DC Coefficients

Calculating $D_{0,0}$ the quantization error for the DC coefficient is explained in the U.S. Pat. No. 6,101,278 herein incorporated by simple reference. $D_{0,0}$ is estimated directly from the knowledge of the intra-dc precision.

TABLE 1

| DC quantization error estimation | |
|---|---|
| Intra_DC_Precision | Average DC quantization error |
| 8 | 4 |
| 9 | 2 |
| 10 | 1 |
| 11 | 0 |

After obtaining the quantization error for both DC and AC coefficients in DCT domain, the statistics estimator 26 finally determines the average of the AC and the DC coefficient MSE, which can be expressed mathematically as follows:

$$MSE = D = \frac{\sum_{i=0,j=0}^{i=7,j=7} D_{i,j}}{64}. \quad (6)$$

Thereafter, the PSNR calculator 28 determines the PSNR, using the average quantization error obtained by the statistics estimator 26. The value of PSNR is used to evaluate any degradation in the video quality and can be computed using the following equation:

$$PSNR = 10\log_{10}\frac{255 \times 255}{D}. \quad (7)$$

Figure 4:
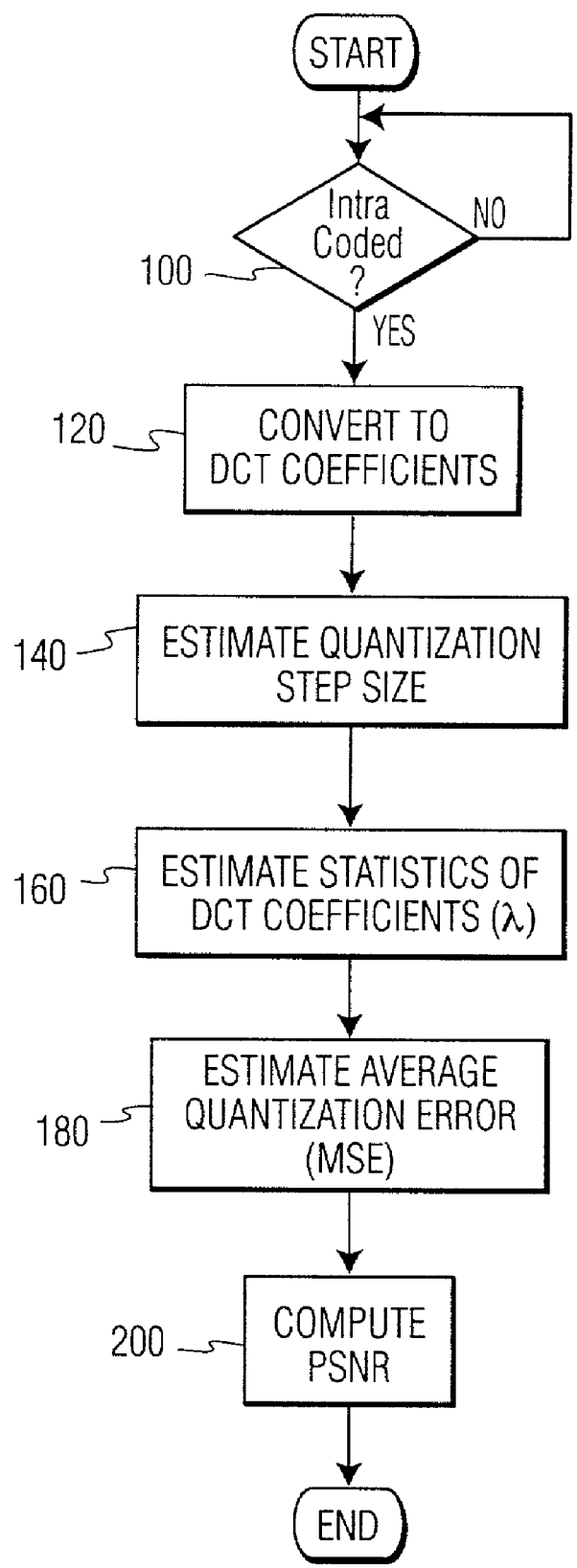

FIG. 4 is a flow diagram depicting the operation steps of evaluating video quality in accordance with the embodiment of the present invention. It should be noted that the processing and decision blocks can represent steps performed by functionally equivalent circuits, such as a digital signal-processor circuit or an application-specific integrated circuit (ASIC). The flow diagrams do not depict the syntax of any particular programming language. Rather, the flow diagrams illustrate the functional information that a person of ordinary skill in the art requires to fabricate circuits or to generate computer software to perform the processing required of the particular apparatus.

Upon receiving the decoded video output from the decoder 14, an 8×8 block DC-precision computation is performed by the picture-type determinator 20 to determine whether the decoded video is intra-coded for each macroblock in step 100. It is noted that the intra-coded pictures possess unique statistical properties from non-compressed pictures, or P and B coded pictures. In step 120, after determining that the current picture being analyzed is an intra-coded picture, the detected intra-coded picture is then subjected to a DCT transform by the DCT block 22 to generate DCT coefficients for AC frequency bands in the video data. In step 140, the quantization parameter extractor 24 operates to extract a quantization matrix for each frame that corresponds to those used in a previous coding operation. The process of extracting quantization matrices ($W_{i,j}$) is explained in U.S. Pat. No. 6,101,278, as cited earlier. The quantization parameter extractor 24 further operates to extract a quantizer step size/scale for each macroblock.

Thereafter, in step 160, estimating $\lambda^2_{i,j}$, statistics of DCT coefficients, is performed for the AC coefficients according to equations (1) and (2). After determining the DCT statistics $\lambda^2_{i,j}$, in step 160, the average AC quantization error is estimated in step 180 using equations (5). The average DC quantization error is estimated directly from the intra-DC precision as shown in Table 1. The AC and DC quantization errors are averaged to obtain the overall quantization error as shown in equation (6). Finally, in step 200, the PSNR is calculated using equation (7).

Having thus described the preferred embodiment of a system and method for computing the Peak Signal-to-Noise Ratio (PSNR), it should be apparent to those skilled in the art that certain advantages of the system have been achieved. The PSNR of compressed video without reference to the original video can be used to evaluate the picture quality in accordance with the present invention. While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for evaluating the quality of encoded video data, the method comprising the steps of:
    decoding at least a substantial portion of said encoded video data to produce decompressed video data including a plurality of blocks;
    performing a discrete cosine transform (DCT) on said decompressed video data to produce a set of DCT coefficients including at least one DC frequency band and at least one AC frequency band;
    obtaining a DCT coefficient parameter ($\lambda^2$) and a quantization step size ($\alpha_{i,j}$) for each block of said decompressed video data;
    estimating an average quantization error (D) for each set of said DCT coefficients based on said DCT coefficient parameter said quantizer step size; and,
    computing a peak signal to noise ratio (PSNR) based on said average quantization error (D).

2. The method of claim 1, wherein the step of estimating said average quantization error (D) comprises the steps of estimating the average quantization error ($D_{i,j}$) for the AC frequency band and the step of estimating the average quantization error ($D_{0,0}$) for the DC frequency band.

3. The method of claim 1, wherein said PSNR is calculated as follows:

$$PSNR = 10\log_{10}\frac{255 \times 255}{D},$$

where D represents said average quantization error.

4. The method of claim 1, wherein said average quantization error (D) is computed as follows:

$$MSE = D = \frac{\sum_{i=0,j=0}^{i=7,j=7} D_{i,j}}{64}$$

where $D_{i,j}$ represents a quantization error for the (i,j)th AC and DC frequency bands in each block.

5. The method of claim 1, wherein said average quantization error for the AC frequency band is determined by the following equation:

$$D_{i,j} = 2\lambda^2_{i,j} - \frac{2\lambda_{i,j}\Delta_{i,j}e^{-\frac{\alpha_{i,j}}{\lambda_{i,j}}}e^{-\frac{\Delta_{i,j}}{2\lambda_{i,j}}}}{\left(1-e^{-\Delta_{i,j}/\lambda_{i,j}}\right)}\left[\frac{\alpha_{i,j}}{\lambda_{i,j}}+1\right]$$

where $\lambda^2_{i,j}$ represents said DCT coefficient parameter for said AC frequency band and $\alpha_{i,j}$ represents said quantizer step size.

6. The method of claim 5, wherein said DCT coefficient parameter ($\lambda^2_{i,j}$) for said AC frequency band is determined by equating a computed second moment to an estimated second moment of said DCT coefficients.

7. The method of claim 6, wherein said computed second moment is represented by the following equations:

$$S_{i,j} = \frac{\sum_{b=1}^{N} (C^b_{i,j})^2}{N},$$

where $$C^b_{i,j}$$

represents the (i,j)th AC coefficient in block b and N is the total number of blocks.

8. The method of claim 6, wherein said estimated second moment is represented by the following equation:

$$S_{i,j} = \Delta^2_{i,j} e^{-\frac{\alpha_{i,j}}{\lambda_{i,j}}} e^{-\frac{3\Delta_{i,j}}{2\lambda_{i,j}}} \left[ \frac{1 + e^{-2\Delta_{i,j}/\lambda_{i,j}}}{(1 - e^{-\Delta_{i,j}/\lambda_{i,j}})^2} \right],$$

for a low AC frequency band, and $$S_{i,j} = 2\lambda^2_{i,j}$$

for a high AC frequency band.

9. The method of claim 1, wherein said quantization step size ($\Delta_{i,j}$) corresponds substantially to coding parameters used in a coding operation that was previously performed on said encoded video data.

10. The method of claim 1, wherein the step of performing said DCT on said decompressed video data is performed when an intra-coded picture in each block of said decompressed video data is detected.

11. The method of claim 10, wherein the intra-coded picture is detected according to the following steps:
   extracting an intra-dc-precision level from said decompressed video data; and,
   if said intra-dc-precision level is less than a predefined threshold, determining that said decoded video data as the intra-coded picture.

12. An apparatus for evaluating the quality of encoded video data comprising:
   a decoder for decoding at least a substantial portion of said encoded video data to produce therefrom decompressed video data including a plurality of blocks;
   a discrete cosine transform (DCT) configured to transform said decompressed video data into a set of DCT coefficients comprised of DC and AC frequency bands;
   a quantization extractor for extracting a DCT coefficient parameter ($\lambda^2$) and a quantization step size ($\Delta_{i,j}$) for each block of said decompressed video data;
   a statistics estimator for estimating an average quantization error (D) for each set of said DCT coefficients based on said quantizer step size and said DCT coefficient parameter; and,
   a calculator for determining a peak signal to noise ratio (PSNR) based on said average quantization error (D).

13. The apparatus of claim 12, wherein said statistics estimator operates to estimate said average quantization error (D) for said AC frequency band and said DC frequency band.

14. The apparatus of claim 12, wherein said average quantization error ($D_{i,j}$) for the AC frequency band is determined by the following equation:

$$D_{i,j} = 2\lambda^2_{i,j} - \frac{2\lambda_{i,j}\Delta_{i,j} e^{-\frac{\alpha_{i,j}}{\lambda_{i,j}}} e^{-\frac{\Delta_{i,j}}{2\lambda_{i,j}}}}{(1 - e^{-\Delta_{i,j}/\lambda_{i,j}})} \left[ \frac{\alpha_{i,j}}{\lambda_{i,j}} + 1 \right]$$

where $\lambda^2_{i,j}$ represents said DCT coefficient parameter for the AC frequency band and $\Delta_{i,j}$ represents said quantizer step size.

15. The apparatus of claim 12, wherein said DCT coefficient parameter ($\lambda^2_{i,j}$) for the AC frequency band is determined by equating a computed second moment to an estimated second moment of said DCT coefficients.

16. The apparatus of claim 15, wherein said computed second moment is represented by the following equations:

$$S_{i,j} = \frac{\sum_{b=1}^{N} (C^b_{i,j})^2}{N},$$

where $$C^b_{i,j}$$

represents the (i,j)th AC coefficient in block b and N is the total number of blocks.

17. The apparatus of claim 15, wherein said estimated second moment is represented by the following equation:

$$S_{i,j} = \Delta^2_{i,j} e^{-\frac{\alpha_{i,j}}{\lambda_{i,j}}} e^{-\frac{3\Delta_{i,j}}{2\lambda_{i,j}}} \left[ \frac{1 + e^{-2\Delta_{i,j}/\lambda_{i,j}}}{(1 - e^{-\Delta_{i,j}/\lambda_{i,j}})^2} \right]$$

for a low AC frequency band, and $$S_{i,j} = 2\lambda^2_{i,j}$$

for a high AC frequency band.

18. The apparatus of claim 12, further comprising a picture detector for detecting for an intra-coded picture in each block of said decompressed video data.

19. The apparatus of claim 18, wherein said picture detector comprises:
   means for extracting an intra-dc-precision level from said decompressed video data; and,
   means for classifying said decoded video data as an intra-coded picture when said intra-dc-precision level is less than a predefined threshold.

20. The apparatus of claim 12, wherein said PSNR is calculated as follows:

$$PSNR = 10 \ \log_{10} \frac{255 \times 255}{D},$$

where D represents said average quantization error.

21. The apparatus of claim 12, wherein said quantization step size ($\Delta_{i,j}$) corresponds substantially to coding parameters used in a coding operation that was previously performed on said encoded video data.

22. A system for evaluating the quality of encoded video data comprising:
   a memory for storing a computer-readable code; and,
   a processor operatively coupled to said memory, said processor configured to:
   decode at least a substantial portion of said encoded video data to produce decompressed video data including a plurality of blocks;
   perform a discrete cosine transform (DCT) on said decompressed video data to produce a set of (i,j)th DCT coefficients including at least one DC frequency band and at least one AC frequency band;
   obtain a DCT coefficient parameter ($\lambda^2$) and a quantization step size ($\Delta_{i,j}$) for each block of said decompressed video data;
   estimate an average quantization error (D) for each set of said DCT coefficients based on said DCT coefficient parameter said quantizer step size; and,
   calculate a peak signal to noise ratio (PSNR) based on said average quantization error (D).

23. The system of claim 22, wherein said processor is further operative to
   extract an intra-dc-precision level from said decompressed video data; and,
   determine that said decompressed video data as an intra-coded picture when said intra-dc-precision level is less than a predefined threshold.

24. The system of claim 22, wherein said processor performs said DCT on said decompressed video data if said decompressed video data is determined to be the intra-coded picture.

* * * * *